Feb. 27, 1940. M. J. DE MASK 2,191,645
BUS DUCT
Original Filed July 12, 1935

INVENTOR:
Martin J. De Mask

Patented Feb. 27, 1940

2,191,645

UNITED STATES PATENT OFFICE 2,191,645

BUS DUCT

Martin J. De Mask, Pittsfield, Mass.

Original application July 12, 1935, Serial No. 30,956. Divided and this application August 12, 1937, Serial No. 158,676

2 Claims. (Cl. 174—88)

This invention relates to electrical distribution systems. It more particularly relates to the class of systems shown and described in my prior application, Serial Number 30,956, filed July 12, 1935, of which the present application is a division.

The invention of the present application relates to an improved bus duct, also to an improved opening in a bus duct. Other improvements of the inventions of the present application will be readily apparent to those skilled in the art upon reference to the appended drawing, in which Fig. 1 is a fragmentary side elevational view, partially broken away, of a length of bus duct according to my invention;

Figure 1:
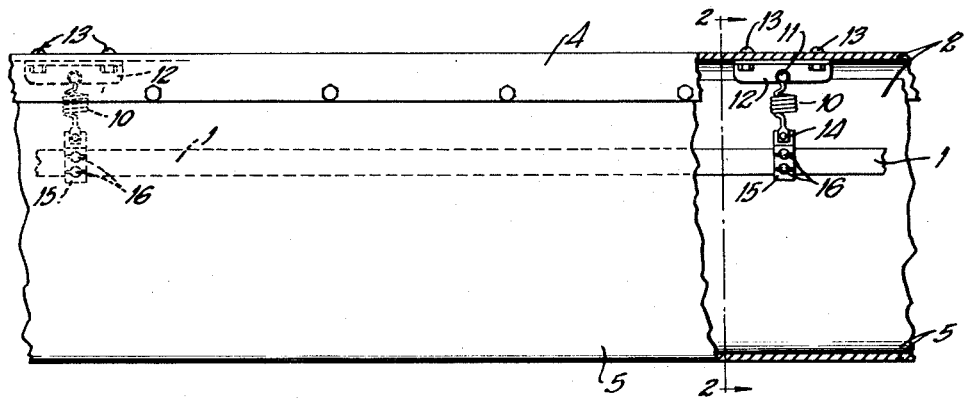

Referring to the drawing, substantially rigid bus bars, indicated at 1, are shown as extending longitudinally of a duct 2. In the drawing the bus bars are shown as three in number but it will be understood that the number of bus bars may be varied as required.

Figure 3:
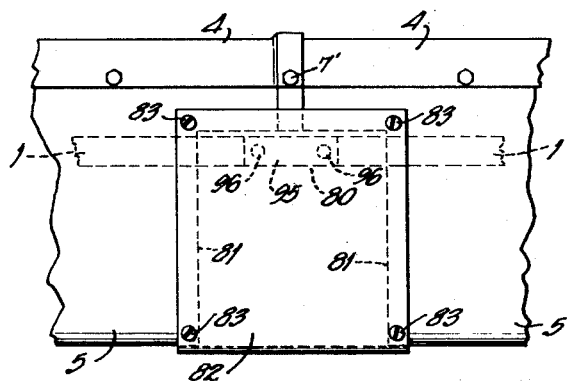
Fig. 3 is a side elevational view of an opening in the bus duct, and of a cover for the same.
Figure 2:
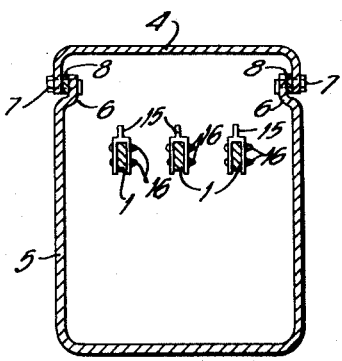
Fig. 2 is a sectional view substantially on line 2—2 of Fig. 1.

The duct, as best shown in Figs. 1 and 3, is usually made up of lengths joined end to end by being overlapped and bolted, as shown in Fig. 3 by means of bolts 7' (only one shown) on opposite sides of the bus duct, each length comprising a shallow channel member 4 from which the bus bars are supported as later described and a mating channel member 5 of greater depth than member 4. It will be seen that member 5 completely encloses the bus bars on three sides and is joined to member 4 in a plane in the space between the bus bars and the back wall of member 4. The edges of member 5 are bent inwardly as at 6 for insertion into underlapping relation with the edges of member 4 and the parts are held together at suitable intervals by bolts 7 or other suitable means. It will be seen that by inserting the edges of member 5 into underlapping relation with the edges of member 4, that a more dust tight joint is obtained than would be the case if the edges of member 5 were not inserted within member 4. Gaskets 8 may be positioned between the lapped portion of the duct members, if desired, to render the joint fluid-tight. By the arrangement just described the installation of the power system is greatly simplified since the mounting, splicing, repair, and other installation and servicing operations are facilitated by the freedom of access to the bus bars afforded before member 5 is put in place or by its removal. A further advantage of the structure resides in the fact that after installation if changed conditions require bus bars of greater or less size and capacity the desired change can easily be made without changing the supporting member 4 which is secured to a wall or ceiling so as to be stationary, and members 5 of greater or less depth may be similarly substituted to meet changed needs with respect to the capacity of the duct.

The bus bars are supported at suitable intervals from member 4 by means of spring hangers, shown as comprising a coiled spring 10 having one end flattened and riveted or bolted, as indicated at 11, to an insulating base 12, secured to member 4 by bolts 13 or other suitable means. The opposite end of the spring is flattened and riveted or otherwise secured as at 14 to a flat metal strip 15 which is preferably attached by means of bolts, provided with wing nuts 16, to the bus bars. In ordinary practice the bus bars are formed of copper while the duct is made of steel. In consequence there is a difference in the degree of expansion and contraction under changes of temperature between the bus bars and the duct which tends to buckle one or both or to loosen the bolts or other securing means by which the various parts are held together. The springs 10 which are sufficiently stiff to resist, while cushioning, the normal strains to which they are subjected, yield sufficiently to accommodate the differences in expansion and contraction between the bus bars and the duct.

Power take-off leads may be connected to the bus bars through conventional "knock out" openings in the duct or through openings similar to those shown in my prior application Serial Number 30,956, these openings being formed at intervals along one or more sides of member 5. It is also advantageous to connect such power take-off leads to the bus bars by means of a switch device with which fuses or other circuit interrupting means may if desired be associated. As these devices are shown and described in my said prior application, references may be made thereto for a fuller understanding thereof.

Figure 4:
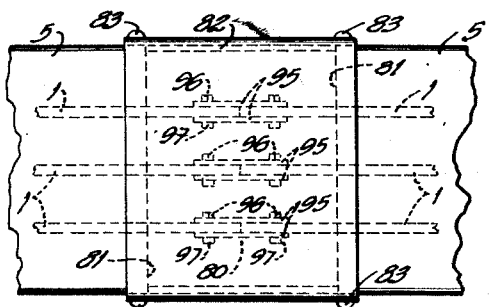
Fig. 4 is a bottom view of Fig. 3.

It is many times desirable to provide for access to the bus bars at various points along the duct such for example as the point where lengths of bus bars are spliced together, as indicated at 80, by means of the plates 95, which are held in position by the bolts 96 and nuts 97, and the present duct structure makes such access possible in an advantageous manner. As shown in Figs. 3 and 4 the duct member 5 is cut away preferably at the end of each length of duct as at 81, the opening preferably registering with adjacent ends of bus bar lengths and extending to above the bus bars. This opening is closed by a single U-shaped member 82, which overlaps the edges of the opening 81 and is held in place by screws 83. Removal of member 82 affords complete unobstructed access to three sides of the bus bars, for inspection or service.

Now having described novel details and arrangements of the bus duct system shown in this application, reference will be had to the following claims which determine the scope of the invention of this application.

What I claim is:

1. A bus duct run comprising bus duct sections each of which includes a substantially closed duct section having an upper wall and a lower wall connected by spaced side walls and containing bus sections, means for detachably securing together the adjacent ends of duct sections to form a continuous duct run, means within said duct sections supporting said bus sections spaced from each other and from said upper wall of each of said duct sections, the adjacent ends of bus sections being normally electrically connected to form continuous bus runs, said bus duct run being provided with an opening permitting access to the bottoms and sides of bus section junctures, said opening being formed by providing one of said adjacent ends of duct sections with a recess, said recess extending across said lower wall and up said side walls of said one of said adjacent ends and terminating above said bus sections, said means for detachably securing together said adjacent ends of duct sections being located above said bus sections so as to allow unrestricted access through said opening to said bus section junctures, and a cover of channel-like form removably secured over said opening.

2. A bus duct run comprising bus duct sections each of which includes a substantially closed duct section having an upper wall and a lower wall connected by spaced side walls and containing bus sections, means for detachably securing together the adjacent ends of duct sections to form a continuous duct run, means within said duct sections supporting said bus sections spaced from each other and from said upper wall of each of said duct sections, the adjacent ends of bus sections being normally electrically connected to form continuous bus runs, said bus duct run being provided with an opening registering with and permitting access to the bottoms and sides of bus section junctures, said opening being formed by providing each of said adjacent ends of duct sections with a recess, said recess extending across said lower wall and up said side walls of each of said duct sections and terminating above said bus sections, said means for detachably securing together said adjacent ends of duct sections being located above said bus sections so as to allow unrestricted access through said opening to said bus section junctures, and a cover of channel-like form removably secured over said opening.

MARTIN J. DE MASK.